No. 614,464. Patented Nov. 22, 1898.
C. J. GUSTAFSON.
BRONZE OR COPPER JOINT RING IN COMBINATION WITH IRON OR STEEL.
(Application filed Apr. 12, 1897.)

(No Model.)

Witnesses
William Owen
Robt S. Umberger

Inventor
C. J. Gustafson

THE NORRIS PETERS CO., PHOTO-LITHO., WASHINGTON, D. C.

United States Patent Office.

CHARLES J. GUSTAFSON, OF SEQUACHEE, TENNESSEE.

BRONZE OR COPPER JOINT-RING IN COMBINATION WITH IRON OR STEEL.

SPECIFICATION forming part of Letters Patent No. 614,464, dated November 22, 1898.

Application filed April 12, 1897. Serial No. 631,872. (No model.)

*To all whom it may concern:*

Be it known that I, CHARLES J. GUSTAFSON, a citizen of the United States, and a resident of Sequachee, in the county of Marion and State of Tennessee, have invented a new and useful improvement in the application of a bronze or copper joint-ring in combination with iron or steel, the whole forming a composite casting, of which the following is a specification.

The objects of my invention are to obtain a "joint-forming" material not subject to corrosion or deterioration by contact with water or other corrosive substance in cast-iron or steel bodies at points where such corrosion or deterioration would damage or destroy the surface forming joints or seats for connection to or abutment against other bodies. Practical applications of this principle are shown in the accompanying drawings, in which—

Figure 1:
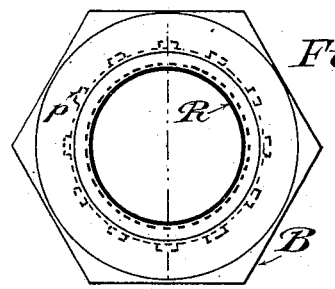
Figure 3:
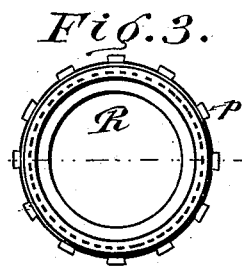
Figure 2:
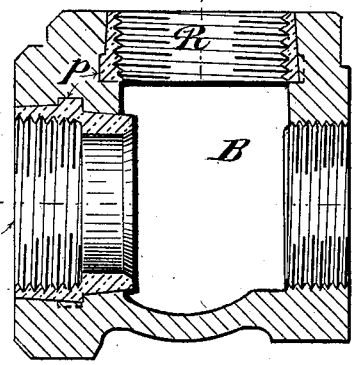
Figure 4:
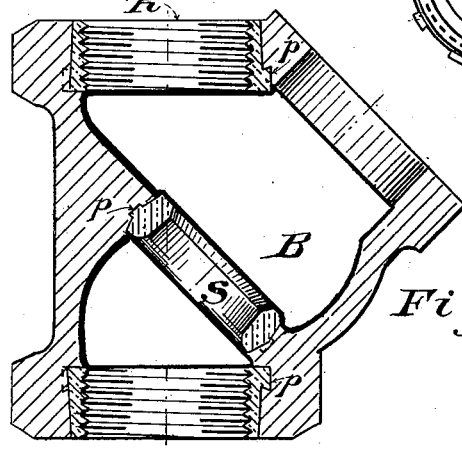
Figure 5:
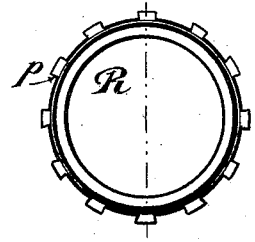

Figure 1 is an end view of a globe-valve, showing bronze lining cast in position for attachment of threaded pipe. Fig. 2 is a longitudinal section of an angle-valve with bronze linings for valve-seat and for attachment of pipes by screw-threads. Fig. 3 is a detail end view of a combination joint-ring and valve-seat. (Longitudinal section of same shown in Fig. 2.) Fig. 4 is a longitudinal view of a globe-valve with joint-rings in both openings for pipe, also independent valve-seat liner cast in position. Fig. 5 is a detail end view of a joint-ring for attachment of screw-threaded pipe.

The joint-ring R S, which may be made of pure copper, of silicon bronze, or of an alloy of copper with any of the white-metals, is first cast independently of the cast-iron or steel body B, of which it is intended ultimately to form a part. After the rings are secured on the core-forming part of the mold the melted iron or steel is poured on and the rings R or S remain fixed in the casting. They are mechanically tightened after cooling by means of a suitable expander, and the rings are bored out or threaded as an integral part of the body B. Projections or dovetails P, located on the outer diameter of these rings, prevent them from pulling out of or turning in the body B. As a further security against pulling out, the outside diameter of the joint-ring R is made larger at the inner end, Figs. 2 and 4, or it is enlarged in the middle when applied as a valve-seat S, as in Figs. 2 and 4. In addition to tightness and durability of joint a further advantage to be derived from the use of these rings R and S when used in iron-body "globe," "angle," or "gate" valves is that an extra-heavy thickness of metal capable of withstanding the highest pressures with safety may be used at a small cost compared with the cost of an all brass or bronze body of ordinary strength and still retain all the advantages possessed by the all brass or bronze body.

I am aware of Patents Nos. 44,326 and 316,588, showing brass valve-seats or rings cast in combination with iron bodies, to which they are secured by end flanges, grooves, or dovetails, and forming an abutting or end face for gate-valves. I therefore do not claim a valve-seat which is secured by any end attachment or dovetail which becomes tight in the main body by the greater shrinkage of the brass in an iron body.

What I claim, and desire to secure by Letters Patent of the United States, is—

A joint-ring provided with dovetails as described, cast in combination with an iron or steel body, and mechanically expanded into fluid-tight contact with said body to form fluid-tight joint with another body.

In testimony whereof I have affixed my signature this 29th day of January, 1897.

C. J. GUSTAFSON.

Witnesses:
WILLIAM OWEN,
ROBT. S. UMBERGER.